Figure 1:
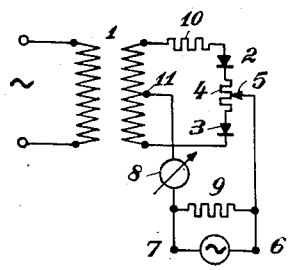

Oct. 3, 1933.  H. PFANNENMÜLLER  1,929,216
APPARATUS FOR CONTROLLING ELECTRICAL CIRCUITS BY MEANS OF ELECTRICAL VALVES
Filed April 1, 1931  2 Sheets-Sheet 1

Inventor:
Hans Pfannenmüller
by Lorra & Kellenbeck
Attorneys

Patented Oct. 3, 1933

1,929,216

UNITED STATES PATENT OFFICE 1,929,216

APPARATUS FOR CONTROLLING ELECTRICAL CIRCUITS BY MEANS OF ELECTRICAL VALVES

Hans Pfannenmüller, Berlin-Siemensstadt, Germany, assignor to Siemens & Halske, Aktiengesellschaft, Siemensstadt, near Berlin, a corporation of Germany Application April 1, 1931, Serial No. 527,030, and in Germany April 3, 1930

10 Claims. (Cl. 171—95)

My invention relates to the control of electric circuits, and more particularly to arrangements for controlling circuits, and especially alternating current circuits by the use of electrical valves, that is to say, devices which oppose a greater resistance to the passage of current in one direction than the other. The invention may be used with advantage in many cases in which mechanical rectifiers have been used hitherto. As an instance of the uses to which the present invention may be applied, I will mention the determination of certain factors in connection with electric power distributing networks or systems, such as the so-called output factor (cos $\phi$), or the value (I cos $\phi$) of the effective current, where I is the current in the network or system, or the value (E cos $\phi$) of the effective voltage, or related factors such as I sin $\phi$ or E sin $\phi$.

According to my invention such an arrangement comprises a pair or a plurality of pairs of such electrical valves which, on the one hand, are connected in the circuit to be controlled, in such an arrangement that the direction in which one valve allows current to pass will be opposite to the direction in which the other valve of the same pair allows current to pass. On the other hand, said valves are connected to a source of periodically variable controlling current in such a manner that the two valves of the same pair will allow the controlling current to pass in the same direction, and impede its passage in the opposite direction. Thus, at any particular moment, both valves of the same pair will allow the controlling or exciting current to pass through them in one and the same predetermined direction, or both valves will stop or impede the flow of the exciting current in the opposite direction. With reference to the source of measured current, however, the two valves of the same pair are arranged to exert opposite effects, so that without separate excitation one valve of the pair stops the flow of a current coming from the source of measured current, but at the same moment the other valve of the pair permits the measured current to pass freely. In relation to the exciting circuit, as also in relation to the source of measured current, the valves may be connected in parallel or in series. In addition to the valves the apparatus may also contain other controlling members, more particularly ohmic resistances. In order to be able to apply the above stated principles conveniently to more complicated connections, it is, in determining the direction of the current in relation to the terminals, advisable to imagine as broken all lines leading to the source of measured current, if it is desired to determine the direction of flow of the exciting current through the valves, and, conversely, when determining the direction of flow of the measured current through the valves, to imagine as broken all lines which lead to the source of the exciting current.

It is by no means necessary to use separate valves and any desired combination of a plurality of resistances favoring the passage of current in one direction (asymmetric conductors) may equally well be employed as long as these combinations themselves function as electric valves or asymmetric conductors.

The effect of the control connection is based upon the fact that on altering the polarity of the applied voltage or the direction of the current, there occurs a change in the resistance of the individual valves, which may be dry rectifier valves, such as copper oxide or selenium valves, detectors or rectifier tubes, said change being of such a character that in the event of the action of a voltage or a current in the stopping direction the resistance becomes higher than in case of an action of a voltage or a current in the direction of flow. The resistance of the valve thus oscillates synchronously with the exciting voltage or the exciting current. If a voltage is applied to a variable resistance, which, for instance, may be varied mechanically by means of a sliding contact, the current set up by the applied voltage will change not only with this voltage but also synchronously with the resistance. It may just as well be assumed that such a variable resistance is traversed by a variable current. In this case the potential drop in the resistance oscillates synchronously with the current and the resistance variations.

In the accompanying drawings eleven embodiments of my invention are illustrated by way of example. Each of Figs. 1 to 11 is a diagrammatic view illustrating a different embodiment of my invention.

Referring to Fig. 1 of the drawings, 1 is an exciting transformer constituting a source of current for supplying the controlling voltage; to the secondary winding of this transformer are connected two electrical or rectifying valves 2 and 3 both permitting current to pass in the same direction but impeding the passage of current in the opposite direction, 4 is a resistance with a slide 5. The slide 5 is connected to one terminal 6 for the source of measured current, the other terminal 7 of the source of measured current is connected through a galvanometer 8 to the central portion of the secondary winding of the exciting transformer 1. The resistance 4 with its sliding tap 5 enables the source of measured current to be connected to two points of as far as possible equal potential in relation to the voltage impressed by the secondary of the transformer.

By adjusting the slide 5 any inequalities between the rectifiers or electrical valves 2 and 3 may easily be compensated. If the arrangement is to be used in a finished apparatus and not only for an experimental connection, the resistance 4 will not be provided with a sliding tap 5 but with a stationary tap after the resistance has been adjusted. The resistance 9 is a shunt necessary for current measurements. The resistance 10 limits the current in case the excitation takes place in the direction of flow.

If a normal or standard alternating voltage is supplied to the primary of the exciting transformer, the resistance of the rectifying or electrical valves 2 and 3 oscillates in synchronism with this alternating voltage. During one alternation or half-wave the resistance is low (current passes freely), during the next alternation or half-wave the resistance is very high (the flow of current is stopped or impeded). The resistance 4 must then be so adjusted that there exists no potential difference between the points 5 and 11. If the two rectifying valves are exactly alike the resistance 4 may be omitted. If an alternating voltage in synchronism with the excitation is supplied to the points or taps 5 and 11 through a direct current ammeter, an alternating current will flow through such ammeter 8. Assuming the valves 2 and 3 to be ideal valves, i. e. that their resistance is zero during the time they pass current and infinite during the time they stop the flow of current, the arrangement will, in relation to the source of measured current 6 and 7, act like a relay which closes the circuit during a half period (current flows), and opens during the next half period (current stopped). The direct current component supplied through the instrument is $$\frac{e}{r} \cdot \cos \phi,$$

wherein $e$ is the terminal voltage at 6 and 7, $r$ the resistance of the instrument 8 and $\phi$ the phase shift or angle between the exciting voltage of the transformer and the voltage of the measured current flowing through the instrument 8. The arrangement thus acts in this case like a mechanical rectifier.

Electric rectifying valves generally have a threshold value, i. e. the resistance depends on the polarity only above a definite voltage or current load, below this threshold the valves behave like ohmic resistances.

With such valves it is thus impossible to measure voltages or currents below the threshold value, and even measurements in the vicinity of the threshold become generally unreliable. My control arrangement is particularly suitable for measurements below the threshold value in cases of synchronous and phase-coincident excitation. During the period of flow the measured current is so to say carried through the valves by the exciting current without the exciting current passing to any material extent through the circuit of the measured current and the measuring instrument.

Figure 2:
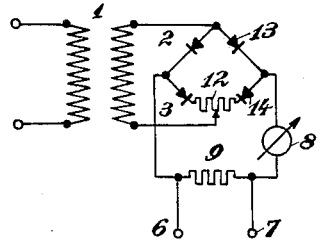

In Fig. 2 of the drawings is illustrated a connection similar to that shown in Fig. 1. Referring to this figure, 1 is again the exciting transformer, 2 and 3 the two electrical valves of a pair, 6 and 7 the two terminals for the source of measured current, 8 the galvanometer and 9 the shunt resistance for the ammeter. The terminal 6 is connected to the pair of valves 2 and 3 in the same manner as in Fig. 1. The terminal 7 is, however, no longer connected to the secondary winding of the transformer, but to a second pair of electrical valves 13 and 14 which pair is connected in parallel to the first named pair. The source of measured current is consequently here also carried to two points of equal potential in relation to the excitation, the exact potential equality being again adapted to be brought about by means of a variable resistance with adjustable tap 12. Here also the measured current is able to flow only when the exciting current flows in the direction in which the valves permit its passage while in case of the reverse direction of the exciting current the pairs of valves will impede or stop the passage of the measured current. In contrast with the embodiment of my invention illustrated in Fig. 1 the measured current, in the arrangement according to Fig. 2, does not pass through the secondary winding of the exciting transformer.

Figure 3:
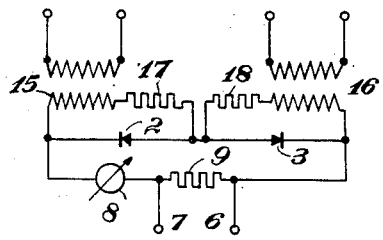
Figure 4:
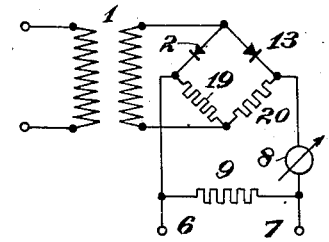
Figure 5:
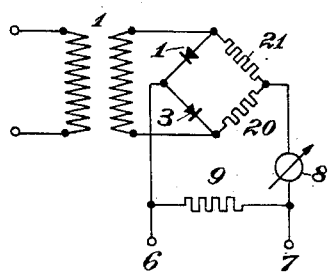
Figure 6:
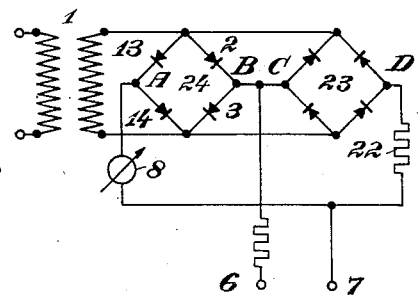

A further example of how my invention may be reduced to practice is illustrated in Fig. 3. A rectifier or electrical valve 2 is connected to the secondary winding 15 of a transformer through a resistance 17, and in a similar manner a valve 3 of the same character is connected through the resistance 18 to the secondary winding 16 of the same or of another transformer. The exciting current is supplied through the transformer or transformers. The two transformers, or at least the two secondary windings are alike electrically, as are also the resistances 17 and 18 provided the valves 2 and 3 are also alike. In relation to the terminals 6 and 7 the exciting voltage is then equal to zero. A further connection is obtained from the system of connections according to Fig. 2 if the two rectifier valves 3 and 14 of Fig. 2 are simply omitted. There remains then a single active pair of valves only with the two valves 2 and 13 which in relation to the exciting current are connected in parallel. A modification of this arrangement is illustrated in Fig. 5 of the drawings. It is derived from the connection illustrated in Fig. 2 by replacing the valves 13 and 14 with resistances 20 and 21 and omitting the variable resistance 12. The resistances 20 and 21 are preferably so dimensioned that their ohmic value $$r = \sqrt{r_s \cdot r_d},$$

wherein $r_s$ is the mean resistance of the electrical valve with current flowing in the direction of rectification, and $r_d$ the mean resistance of such valve in the opposite direction, blocking or impeding the passage of current. In the hereinbefore described examples of construction only one half-wave or alternation of the measuring current is fed into the measuring instrument, while during the stopping period the other alternation or half-wave is not able to develop at all or is discharged through the shunt 9. The shunt causes increased current consumption and it is thus advisable to short circuit the unused alternation or half-wave. A suitable arrangement for this purpose is shown in Fig. 6. With 1 to 14 are again designated the same parts as in the preceding figures of the drawings. 22 is a loading resistance which has been chosen in correspondence with the galvanometer resistance. This loading resistance is connected to a double pair of valves 23 which is connected in parallel to the double pair 24 composed of the valves 2, 3, 13 and 14. The valves of the double pair 23 function, however, in the opposite direction to the valves of the double pair 24, in relation to the excitation. Through the double pair 23 the second alternation or halfwave unutilized for the measurement is able to be balanced out of the measuring circuit.

The points A and B, Fig. 6, by which the source of measured current is connected to the double pair 24 of rectifier or electrical valves must have equal control potential because the control voltage and control current must not be permitted to pass to any considerable extent into the instrument circuit and into the source of measured current. The points C and D at which the discharge circuit is connected to the double pair 23 of rectifier or electrical valves must also possess the same potential. In the connection according to Fig. 6 equal control potential must at the same time prevail at the points B and C as otherwise equalizing currents penetrating into the source of measured current would develop.

All these conditions can only be fulfilled with difficulty in the connection illustrated in Fig. 6 if any degree of accuracy is required, for instance for an exact measurement. This difficulty is due to the fact that the copper oxide rectifiers and the like when manufactured on a large scale differ individually in the value of their resistances and in their characteristics.

The potential of the point A may, at least for a definite momentary value of a load, fairly easily be brought to the potential of the point B, and the potential of the point C to that of the point D, by, for instance, correspondingly choosing the rectifiers or electrical valves of the double pair 23 and the double pair 24. Each pair of valves of the double pairs 23 and 24 may also be replaced by balancing resistances, but this method is an imperfect substitute, particularly for the reason that the load changes practically continuously. On the other hand it is rather difficult to find valves with equal resistances and characteristics for a considerable number of pairs, and thus to maintain all four points ABCD at the same control potential. According to my invention the difficulties recited above are eliminated by connecting the circuits, or the resistances to be controlled of these circuits, to one of a plurality of windings independent as regards potential, that is windings insulated from one another, which are connected to the source of control current or the source of measured current or receive their power from the latter.

Figure 7:
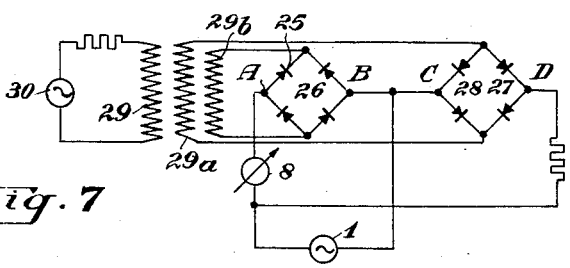
Figure 8:
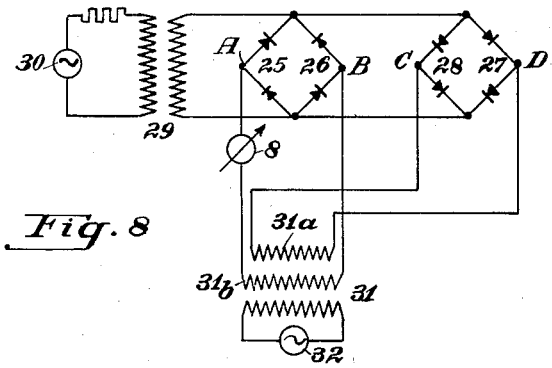
Figure 9:
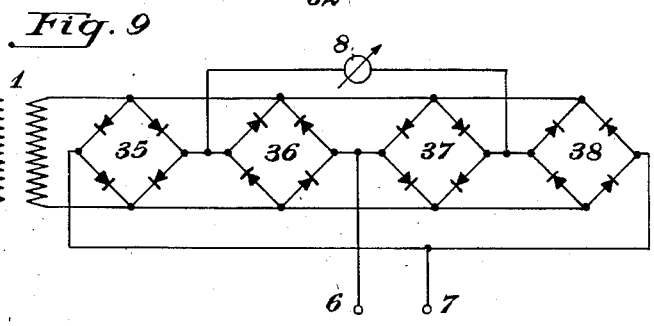

Some embodiments of this part of my invention are illustrated in Figs. 7 to 9 of the drawings. In the embodiment shown in Fig. 7, which as regards the principle of operation of the connection is identical with Fig. 6, the control transformer 29 has two secondary windings 29a and 29b each of which is independent of the other, and one of which serves for the control of the instrument circuit with the electrical valve pairs 25 and 26 and the other for the control of the shunt with the electrical valve pairs 27 and 28. If, for instance, the control voltage amounts to 10 volts and if the resistances of the rectifying or electrical valves of the pairs 25 and 26 are equal, the control voltage will be exactly halved at the points A and B, i. e. if the potential zero is ascribed to the upper lead, the potential of 5 volts prevails at the points A and B. The resistances of the upper valves of the pairs 27 and 28 may on the other hand be lower than the resistances of the lower valves of these pairs, for instance so that at the points C and D the voltage supplied from the secondary winding 29a is divided up in the ratio of 4:5. In the connection according to Fig. 6, if the potential zero is ascribed to the upper lead to the double pairs 23 and 24, the potential of 5 volts would prevail in this case at the points A and B, but at the points C and D only the potential of 4 volts, and in consequence thereof compensating currents would appear, as pointed out above, which would adversely affect the correctness of the measurements. In the connection according to Fig. 7, on the other hand, these disturbances cannot occur since the two windings 29a and 29 themselves are independent of each other as regards the potential. If the upper lead to the pairs 25 and 26 has the potential zero, for instance in consequence of grounding, the points A and B and of necessity also the points C and D assume the potential of 5 volts, the upper lead to the pairs 27 and 28 then assuming the potential of 1 volt and the lower lead to the pairs 27 and 28 the potential of 11 volts, which however is harmless since the windings 29a and 29b are not connected to each other.

The same advantages which in the connection according to Fig. 7 are attained by providing the control transformer 29 with two independent secondary windings, each of which serves for the control of only one double pair of electrical valves, may also be obtained by connecting between the source of current 32 and the circuits to be supplied by it, inclusive of the instrument 8, a transformer with two secondary windings. An example of this kind is illustrated in Fig. 8 of the drawings.

Referring to this figure, 31 is the transformer connected between the source of current 32 and the instrument circuit and the leading-away circuit. The one secondary winding 31b of this transformer feeds the circuit containing the instrument 8 and the other secondary winding 31a feeds the leading-away circuit. The mode of operation corresponds to that described with reference to the connection shown in Fig. 7.

In conclusion it may be mentioned that it is also possible to utilize both alternations or halfwaves of the measured current. An example of this kind is illustrated in Fig. 9 of the drawings. Referring to this figure, 1 is again the exciting transformer, 6 and 7 the terminals for the source of measured current and 8 the direct current instrument. Four double pairs of electrical valves 35, 36, 37, 38 are connected in parallel to the secondary winding of the exciting transformer. This connection functions exactly as described with reference to the preceding examples. During one alternation or half-wave the current is able to flow from the terminal 6 through the double pair 36, the instrument 8 and the double pair 38 to the terminal 7, while the double pairs 35 and 37 block or impede the passage of such current. During the other alternation the current is able to flow from the terminal 7 through the double pair 35, the instrument 8 and the double pair 37 to the terminal 6 while the double pairs 36 and 38 will block or impede the passage of the measured current owing to the excitation. Thus the current will pass through the instrument 8 in the same direction during both alternations or half waves.

In the connections illustrated in Figs. 7 and 8 an ohmic resistance is shown included in the primary circuit of the transformer 29 serving for the control.

Figure 10:
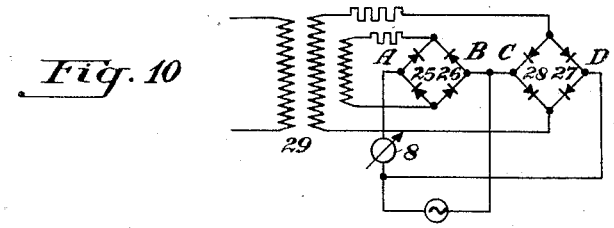

Instead of placing such a resistance in the primary circuit, I may connect it in the secondary transformer circuit, or when the transformer has a plurality of secondaries, each of them may have such a resistance in its circuit, as shown in Fig. 10 of the drawings.

From the above description it will be apparent that my invention may be used in practically all cases where hitherto mechanical synchronous controllers have been employed. For instance, such mechanical controllers have been employed in well-known circuit arrangements for determining values or factors such as I cos $\phi$, E cos $\phi$, I sin $\phi$, and E sin $\phi$, and my invention may be employed for the same purposes, using the same well-known circuit arrangements, and substituting therein my improved electrical valve arrangement or combination, for the mechanical synchronous controllers above referred to. The connections may, furthermore, be employed in conjunction with measuring instruments, relays and the like. In this sense is to be understood the frequently used term "measuring". By my invention it is not intended to determine and record values only, but to make use of them for other purposes, more particularly for regulation purposes.

A substantial advantage of the arrangement described is that the exciting current is unable to flow through the circuit to be controlled and thus through the instrument 8, so that disturbances of the circuit to be controlled and in the source of measuring current and undue loads on the apparatus connected are effectively eliminated.

Figure 11:
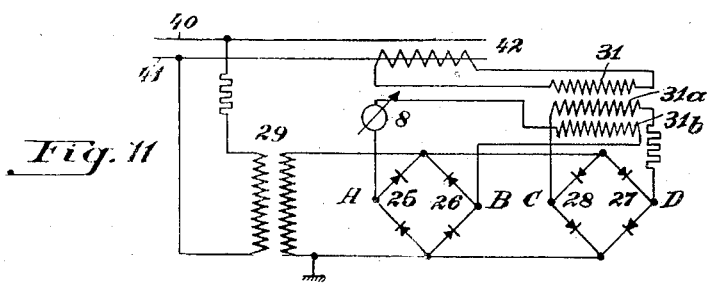

In Fig. 11 of the drawings is shown a connection for the determination of I. cos $\phi$ for a network 40, 41. For effecting the indications a direct current instrument 8 is used which, as in the previous connections, may be of the ordinary moving coil type. The control of the rectifier or electrical valves of the pairs 25 and 26 which form part of the instrument circuit proper and the pairs 27 and 28 which are in the leading-away circuit, takes place from the secondary winding of the potential transformer 29 which is on the primary side connected to the network 40, 41. In the line 41 is connected a standard main current transformer 42 of the secondary terminals of which supply the current to be controlled. To these secondary terminals is connected an intermediate transformer 31. This intermediate transformer has two secondary windings, one winding 31b supplying the current for the instrument circuit, the other winding 31a feeding the superfluous half-wave or alternation to the leading-away circuit so that an injurious interruption of the current transformers or damage to the connected apparatus by excess voltages cannot occur during the period during which the passage of current is stopped or impeded by the electrical valves. The value I is that of the current which flows in the line 41 and the angle $\phi$ is the phase displacement angle between the current I and the network voltage. If now the voltage tapped from the transformer is shifted through an angle of 90° in relation to the voltage of the network, for instance by means of an artificial connection, the deflection of the instrument 8 will be a measure for the value I. sin $\phi$. If the current transformer is replaced by a potential transformer and the potential transformer by a current transformer, the deflection of the measuring instrument is a measure for the value E, cos $\phi$ or, and in the event of an artificial connection being used, a measure for E. sin $\phi$, wherein E is the value of the network voltage. The circuit which contains the measuring instrument may be termed the measuring circuit, or the controlled circuit, while the circuit which impresses an alternating voltage on the electrical valves (through transformers, in the embodiments illustrated) may be termed the controlling circuit.

I claim as my invention:

1. An arrangement for controlling an electric current in synchronism with variations of a controlling voltage, comprising a source of current for supplying the controlling voltage, conductors constituting electrical resistances and forming a controlling circuit connected with said source of current, at least two of said resistances consisting of electrical valves arranged to be influenced by the controlling voltage in the same sense, to block or permit synchronously with the said controlling voltage, the passage of the current to be controlled, two taps located at points of said circuit which are separated by at least one electrical resistance and which have substantially equal potentials with respect to the potential distribution impressed on said circuit by the said source of current which supplies the controlling voltage, and conductors by which the current to be controlled is supplied to said taps.

2. An arrangement for controlling an electric current in synchronism with variations of a controlling voltage, comprising a source of electricity for supplying the controlling voltage, two electrical valves connected in series and conductors for connecting said valves in a controlling circuit with said source of electricity, said valves being arranged to be influenced by the controlling voltage in the same sense, to block or permit synchronously with the said controlling voltage, the passage of the current to be controlled, an electrical resistance in parallel with said valves, a tap at the circuit portion connecting said valves in series, another tap at such a point of said resistance that the latter will be subdivided by said tap in the same proportion of resistances as the first-mentioned tap subdivides the resistance of the series connection of said valves, and conductors by which the current to be controlled is supplied to said taps.

3. An arrangement for controlling an electric current in synchronism with variations of a controlling voltage, comprising a source of electricity for supplying the controlling voltage, two electrical valves connected in series and conductors for connecting said valves in a controlling circuit with said source of electricity, said valves being arranged to be influenced by the controlling voltage in the same sense, to block or permit synchronously with the said controlling voltage, the passage of the current to be controlled, two additional electrical valves in series with each other and in parallel with the first-mentioned valves and arranged to act in the same manner as said first-mentioned valves, as regards permitting the passage of current to be controlled, a tap at the conductor connecting the first-mentioned valves in series, another tap at the conductor connecting the other two valves in series, and conductors by which the current to be controlled is supplied to said taps.

4. An arrangement for controlling an electric current in synchronism with variations of a controlling voltage, comprising a source of electricity for supplying the controlling voltage, two electrical valves and conductors for connecting them in a controlling circuit with said source of electricity, said valves being arranged to be influenced by the controlling voltage in the same sense, to block or permit synchronously with the said controlling voltage, the passage of the current to be controlled, a tap at the circuit portion between said valves, another tap at such a point of said circuit that there will be at least one resistance in all electrical connections from one tap to the other and that such taps will have substantially equal potentials with respect to the potential distribution impressed by said source of electricity, conductors by which the current to be controlled is supplied to said taps, and a direct-current measuring instrument located in one of said conductors.

5. An arrangement of the type described, comprising a measuring circuit, a source of electricity for supplying alternating current to said circuit, a direct-current measuring instrument and a controlling arrangement both in series connection in said measuring circuit, said controlling arrangement serving to control the measuring circuit in synchronism with an alternating controlling voltage of the same frequency as the measuring current and said controlling arrangement including a source of alternating current for supplying such controlling voltage, two electrical valves and conductors for connecting them with said controlling arrangement, said valves being arranged to be influenced by the controlling voltage in the same sense, to block or permit synchronously with the said controlling voltage, the passage of the current to be controlled, a tap at the circuit portion containing said valves, and another tap located at such a point that at least one resistance will be contained in all electrical connections from one tap to the other and that the taps are connected with each other through each of said valves, said taps connecting the controlling arrangement in series with the said direct-current measuring instrument and with the source supplying the current to be measured.

6. An arrangement of the type described, comprising a Wheatstone bridge, means for supplying an alternating measuring current to said bridge, a direct-current measuring instrument in a diagonal arm of the bridge, a controlling arrangement in each of the four side arms of the bridge, common means for supplying to said four arms, an alternating current furnishing a controlling voltage of the same frequency as said measuring current, each of said controlling arrangements including a circuit consisting of resistances and having connections for supplying the controlling voltage thereto, at least two of such resistances consisting of electrical valves in each controlling arrangement, the said valves being arranged to be influenced by the controlling voltage in the same sense, to block or permit at each controlling arrangement, synchronously with the said controlling voltage, the passage of current to be controlled by this controlling arrangement, taps located at two points separated by at least one electrical resistance and having substantially equal potentials with respect to the potential distribution impressed by the controlling voltage, each of said controlling arrangements being located, by way of said taps, in a separate side arm of the bridge, and the current-passing direction of said valves, with respect to the source of controlling current, being the same for valves of the same pair of controlling arrangements located in diagonally-opposite arms of the bridge, but opposite to the current-passing direction of the other pair of valves.

7. An arrangement for controlling an electric circuit in synchronism with variations of a controlling voltage, comprising a plurality of circuits, a common source of electricity for supplying them with alternating current, a plurality of controlling arrangements for controlling said circuits in synchronism with the variations of a controlling voltage, a transformer having a separate secondary and a separate connection for supplying such controlling voltage to each of said controlling arrangements, the said secondaries and connections being insulated from each other up to their junctions with the respective controlling arrangements, two electrical valves in each of said controlling arrangements, said valves being arranged to act in the same current-passing direction with respect to the controlling currents, a tap at the circuit portion containing the two valves, another tap at such a point that at least one resistance will be included in all electrical connections from one tap to the other, and that the taps are connected with each other through both valves, said taps having substantially equal potentials with respect to the potential distribution impressed by the controlling current, and each of said controlling arrangements being connected, by way of said taps, with the respective circuit to be controlled.

8. An arrangement for controlling an electric circuit in synchronism with variations of a controlling voltage, comprising a plurality of circuits, a common source of electricity for supplying them with alternating measuring current, a controlling arrangement in each of said circuits, a common source of electricity supplying to each of said arrangements, a controlling voltage of the same frequency as said measuring current, a transformer having a separate secondary for supplying to each of said circuits, the current derived from said common source of electricity, the said circuits inclusive of the secondaries connected therewith, being insulated from each other up to their junctions with the said controlling arrangements, two electrical valves included in each of said controlling arrangements, and arranged to act in the same current-passing direction with respect to the controlling currents, a tap at the circuit portion containing the two valves, another tap at such a point that at least one resistance will be included in all electrical connections from one tap to the other, and that the taps are connected with each other through both valves, said taps having substantially equal potentials with respect to the potential distribution impressed by the source of controlling current, and each of said controlling arrangements being connected, by way of said taps, with the respective circuit to be controlled.

9. An arrangement for controlling an electric current in synchronism with variations of a controlling voltage, comprising two conductors for supplying the controlling voltage, two conductors for supplying the current to be controlled, at least one pair of electric valves, the valves of such pair being connected to the said conductors for supplying the controlling voltage in such a manner that the valves of such pair will be influenced by the controlling voltage in the same sense, to pass or withhold synchronously with said controlling voltage, the current to be controlled, the valves of such pair being connected in opposition with respect to the conductors for supplying the current to be controlled.

10. An arrangement of the type described, comprising a measuring circuit and means for supplying it with alternating current, another circuit connected in parallel with said measuring circuit, a direct-current measuring instrument included in said measuring circuit, two controlling arrangements, each located in one of said circuits and common means for supplying to both of said controlling arrangements, a controlling alternating voltage of the same frequency as the alternating current of the measuring circuit, at least one pair of electrical valves in each of said controlling arrangements, the valves of the same controlling arrangement being arranged to be influenced by the controlling voltage in the same sense, to block or permit synchronously with the said controlling voltage, the passage of the current to be controlled, but the valves of the two different controlling arrangements being arranged to act at each moment in opposite senses as regards permitting or blocking the passage of said current to be controlled, each controlling arrangement including two taps at such points that at least one resistance will be included in all electrical connections from one tap to the other of the controlling arrangement, and that said taps of each controlling arrangement are connected with each other through both valves, the two taps of each controlling arrangement being located at points of substantially equal potentials with respect to the potential distribution impressed by the controlling voltage, one of the said controlling arrangements being included by its taps in the measuring circuit, the other of the said controlling arrangements being included by its taps in the circuit connected in parallel with said measuring circuit.

HANS PFANNENMÜLLER.